(12) United States Patent
Hsu (10) Patent No.: US 8,717,757 B2
(45) Date of Patent: May 6, 2014

(54) PORTABLE ELECTRONIC DEVICE WITH A SPACE FOR ACCOMMODATING A STYLUS AND A CONNECTOR

(75) Inventor: Su-Kai Hsu, New Taipei (TW)

(73) Assignee: Wistron Corporation, New Taipei (TW)

( * ) Notice: Subject to any disclaimer, the term of this patent is extended or adjusted under 35 U.S.C. 154(b) by 210 days.

(21) Appl. No.: 13/288,032

(22) Filed: Nov. 3, 2011

(65) Prior Publication Data

US 2012/0140428 A1 Jun. 7, 2012

(30) Foreign Application Priority Data

Dec. 1, 2010 (TW) ................................ 99223309 U (51) Int. Cl.
*H05K 5/00* (2006.01)

(52) U.S. Cl.
USPC ................ 361/679.56; 178/19.01; 178/19.04; 361/679.01

(58) Field of Classification Search
USPC .................................................... 361/679.56
See application file for complete search history.

(56) References Cited

U.S. PATENT DOCUMENTS

| | | | | | |
|---|---|---|---|---|---|
| 5,434,373 | A | * | 7/1995 | Komaki | 178/19.01 |
| 6,129,430 | A | * | 10/2000 | Wu | 312/223.2 |
| 6,262,684 | B1 | * | 7/2001 | Stewart et al. | 343/702 |
| 6,410,865 | B1 | * | 6/2002 | Liu et al. | 178/19.01 |
| 6,545,577 | B2 | * | 4/2003 | Yap | 335/205 |
| 6,833,989 | B2 | * | 12/2004 | Helot et al. | 361/679.56 |
| 7,023,430 | B2 | * | 4/2006 | Liu et al. | 345/179 |
| 7,508,383 | B2 | * | 3/2009 | Lev et al. | 345/179 |
| RE41,637 | E | * | 9/2010 | O'Hara et al. | 361/679.4 |
| 7,796,382 | B1 | * | 9/2010 | Li | 361/679.58 |
| 7,825,914 | B2 | * | 11/2010 | Huang et al. | 345/179 |
| 7,834,863 | B2 | * | 11/2010 | Lee | 345/179 |
| 8,059,391 | B2 | * | 11/2011 | Chang et al. | 361/679.08 |
| 8,094,140 | B2 | * | 1/2012 | Katsurahira et al. | 345/179 |
| 8,390,602 | B2 | * | 3/2013 | Liang | 345/179 |
| 8,405,641 | B2 | * | 3/2013 | Tseng | 345/179 |
| 8,462,488 | B2 | * | 6/2013 | Tseng | 361/679.01 |
| 2001/0044908 | A1 | * | 11/2001 | Siu | 713/323 |
| 2002/0003532 | A1 | * | 1/2002 | Huat | 345/179 |
| 2002/0060098 | A1 | * | 5/2002 | Liu et al. | 178/19.01 |
| 2003/0067452 | A1 | * | 4/2003 | Liu et al. | 345/179 |
| 2004/0080989 | A1 | * | 4/2004 | Yu | 365/200 |
| 2005/0219231 | A1 | * | 10/2005 | Silverbrook et al. | 345/173 |
| 2006/0257196 | A1 | * | 11/2006 | Liu et al. | 401/88 |
| 2007/0117430 | A1 | * | 5/2007 | Lin et al. | 439/164 |
| 2009/0050377 | A1 | * | 2/2009 | Lee | 178/19.01 |
| 2009/0256955 | A1 | * | 10/2009 | Kuo et al. | 348/376 |
| 2010/0084202 | A1 | * | 4/2010 | Selin et al. | 178/19.01 |
| 2010/0231557 | A1 | * | 9/2010 | Wang | 345/179 |
| 2010/0238615 | A1 | * | 9/2010 | Li | 361/679.01 |
| 2012/0018336 | A1 | * | 1/2012 | Liu et al. | 206/488 |
| 2012/0194998 | A1 | * | 8/2012 | McClure et al. | 361/679.56 |

* cited by examiner

Primary Examiner — Jayprakash N Gandhi
Assistant Examiner — Robert Brown
(74) Attorney, Agent, or Firm — Winston Hsu; Scott Margo (57) ABSTRACT

A portable electronic device includes a casing whereinside an accommodating space is formed, a signal terminal disposed on a lateral wall of the accommodating space, a stylus accommodated inside the accommodating space of the casing in a movable manner, a push-pop mechanism disposed inside the accommodating space of the casing for fixing the stylus at a corresponding position according to depth of the accommodating space whereinto the stylus enters, and a connector for inserting into the accommodating space of the casing so as to electrically connect with the signal terminal to transmit a corresponding signal.

14 Claims, 10 Drawing Sheets

PORTABLE ELECTRONIC DEVICE WITH A SPACE FOR ACCOMMODATING A STYLUS
AND A CONNECTOR

BACKGROUND OF THE INVENTION

1. Field of the Invention

The present invention relates to a portable electronic device, and more particularly, to a portable electronic device with a space for accommodating a stylus and a connector.

2. Description of the Prior Art

With the advanced computer industry, knowledge can be interchanged, arranged and stored via digital information. A computer for displaying and storing the digital information becomes an important tool in modern society. A portable computer, such as a notebook computer, a person digital assistant, a global positioning system and so on, has advantages of small volume, slight weight and handheld convenience, so that a user can search, browse and store the digital information anytime and anywhere. Therefore, the portable computer is one of the best digital information platforms, and is an important issue of information industry. The portable computer has a multimedia interface, so that an external audio outputting device, such as an external earphone and a speaker, is equipped therewith. On the other hand, the multimedia interface is a human-based inputting interface, and a touch panel and a stylus are utilized for controlling the portable computer. Generally, the user moves the stylus to touch the touch panel, and the touch panel can output different control commands according to inducting position where the touch panel is pressed, so as to control operation of the portable computer.

The conventional portable electronic device includes an accommodating space formed on a lateral side of a casing for accommodating the stylus. A concave is formed inside the accommodating space for engaging with a protrusion of the stylus, so as to fix the stylus inside the accommodating space. In addition, the conventional portable electronic device further includes an audio socket formed on the lateral side of the casining, and the external audio outputting device is electrically connected to the audio socket for performing audio information having preferable quality. Thus, the conventional portable electronic device includes the casing whereon the accommodating space and the audio socket are formed. External aesthetic of the portable electronic device is deteriorated due to the accommodating space and the audio socket, and large mechanical space inside the casing is necessary for respectively accommodating the stylus and the external audio outputting device, so that volume and manufacturing cost of the conventional portable electronic device is increased.

SUMMARY OF THE INVENTION

The present invention provides a portable electronic device with a space for accommodating a stylus and a connector for solving above drawbacks.

According to the claimed invention, a portable electronic device includes a casing whereinside an accommodating space is formed, a signal terminal disposed on a lateral wall of the accommodating space, a stylus accommodated inside the accommodating space of the casing in a movable manner, a push-pop mechanism disposed inside the accommodating space of the casing for fixing the stylus at a corresponding position according to depth of the accommodating space whereinto the stylus enters, and a connector for inserting into the accommodating space of the casing so as to electrically connect with the signal terminal to transmit a corresponding signal.

According to the claimed invention, the push-pop mechanism is further for ejecting the stylus from the accommodating space.

According to the claimed invention, the connector is further for pushing the stylus into the accommodating space when the stylus is accommodated inside the accommodating space.

According to the claimed invention, the push-pop mechanism includes a base disposed inside the casing, a sliding component disposed on the base in a slidable manner, a contacting component connected to the sliding component in a slidable manner, and a supporting component connected to the contacting component. The stylus pushes the supporting component for driving the contacting component and the sliding component to slide relative to the base in a first direction.

According to the claimed invention, a slot is formed on a surface of the sliding component, and the contacting component comprises a sliding bar for sliding inside the slot, so that the contacting component slides relative to the sliding component.

According to the claimed invention, the push-pop mechanism further includes a resilient component connected to the supporting component and the base for moving the supporting component in a second direction opposite to the first direction.

According to the claimed invention, the push-pop mechanism further includes a baffle, and a gear disposed between the sliding component and the baffle for rotating the baffle to engage inside a concave on the base so as to constrain the sliding component relative to the base.

According to the claimed invention, the contacting component is for contacting against the gear in a second direction opposite to the first direction, so as to constrain rotation of the gear.

According to the claimed invention, the contacting component is further for pushing the gear in the second direction opposite to the first direction, so as to slide the baffle and the sliding component relative to the base.

According to the claimed invention, the push-pop mechanism further includes at least one tenon disposed on the base, the tenon being for rotating the gear when the gear slides in the first direction so that the gear rotates the baffle.

According to the claimed invention, the tenon is a one-way tenon, and the one-way tenon does not rotate the gear when the gear slides in the second direction opposite to the first direction.

According to the claimed invention, the push-pop mechanism further includes a resilient clip connected to the one-way tenon.

According to the claimed invention, the connector is an audio signal connector.

The portable electronic device of the present invention can accommodate the stylus and the connector (the audio signal connector) inside the accommodating space simultaneously. The push-pop mechanism of the portable electronic device can fix the stylus at the corresponding position according to the depth of the accommodating space whereinto the stylus enters, so as to economize mechanical space of the portable electronic device for advantages of light weight and preferable aesthetic.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
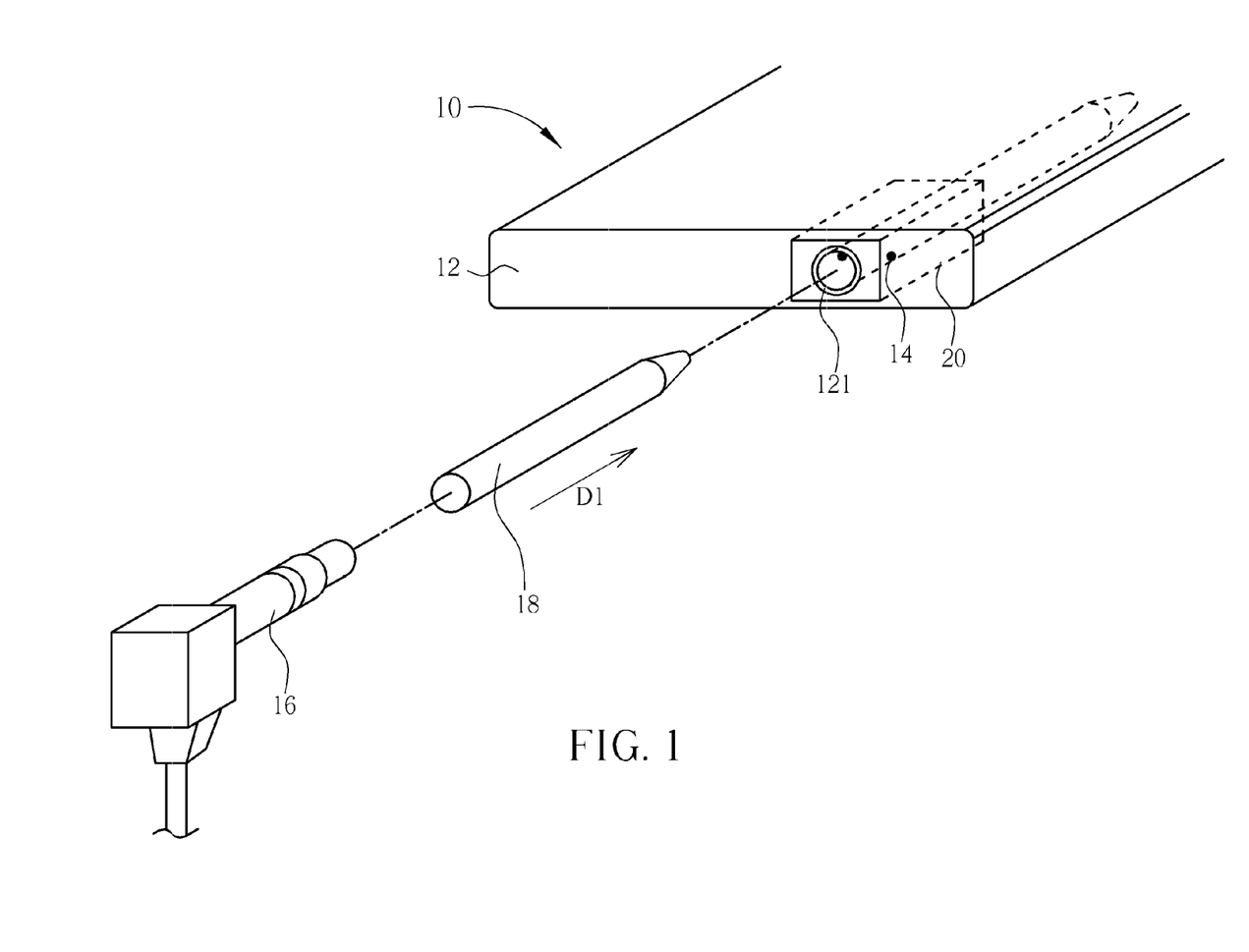
FIG. 1 and FIG. 2 are diagrams of a portable electronic device in different operating modes according to an embodiment of the present invention.
Figure 2:
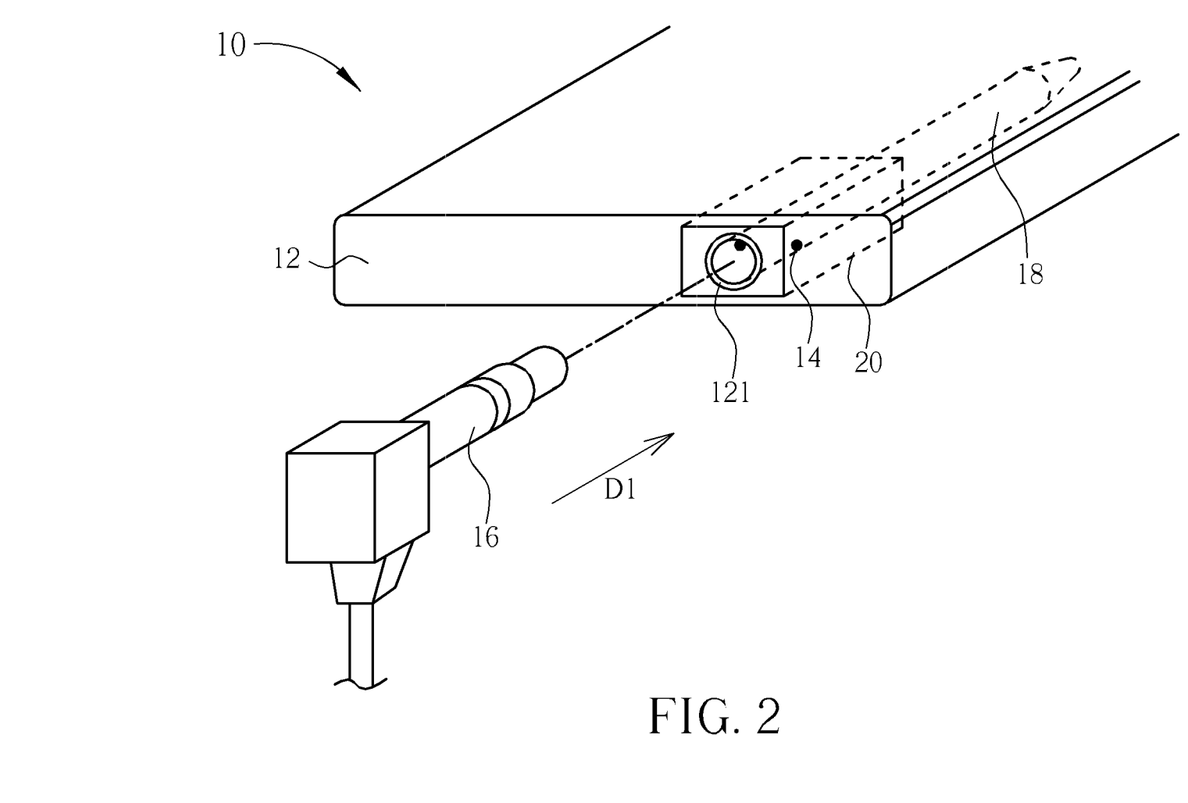

Please refer to FIG. 1 and FIG. 2. FIG. 1 and FIG. 2 are diagrams of a portable electronic device 10 in different operating modes according to an embodiment of the present invention. The portable electronic device 10 includes a casing 12 whereinside an accommodating space 121 is formed, a signal terminal 14 disposed on a lateral wall of the accommodating space 121, and a connector 16 for inserting into the accommodating space 121 of the casing 12 so as to electrically connect to the signal terminal 14 to transmit a corresponding signal. Generally, the portable electronic device 10 can be a personal digital assistant (PDA), a handheld mobile phone, a tablet computer and so on. The connector 16 can be an audio signal connector for inserting into an audio socket, as the accommodating space 121, on the portable electronic device 10, so as to output the corresponding signal, such as a sound signal.

In addition, the portable electronic device 10 further includes a stylus 18 for being accommodated inside the accommodating space 121 of the casing 12 in a movable manner, and a push-pop mechanism 20 disposed inside the accommodating space 121 of the casing 12. The stylus 18 and the connector 16 can be accommodated inside the accommodating space 121 simultaneously, or can be respectively accommodated inside the accommodating space 121. For example, as the stylus 18 is accommodated inside the accommodating space 121, an end of the stylus 18 aligns with an opening of the accommodating space 121, so that the stylus 18 can be ejected from the accommodating space 121 by the push-pop mechanism 20 conveniently. As the stylus 18 has been accommodated inside the accommodating space 121, and the connector 16 is utilized for transmitting the corresponding signal, the connector 16 can be inserted into the accommodating space 121 directly, so as to push the stylus 18 to enter the accommodating space 121 further. Thus, the push-pop mechanism 20 fixes the stylus 18 at a corresponding position according to depth of the accommodating space 121 whereinto the stylus 18 enters. As the connector 16 is inserted into the accommodating space 121, and the stylus 18 is not inside the accommodating space 121, the connector 16 does not drive the push-pop mechanism 20.

Figure 3:
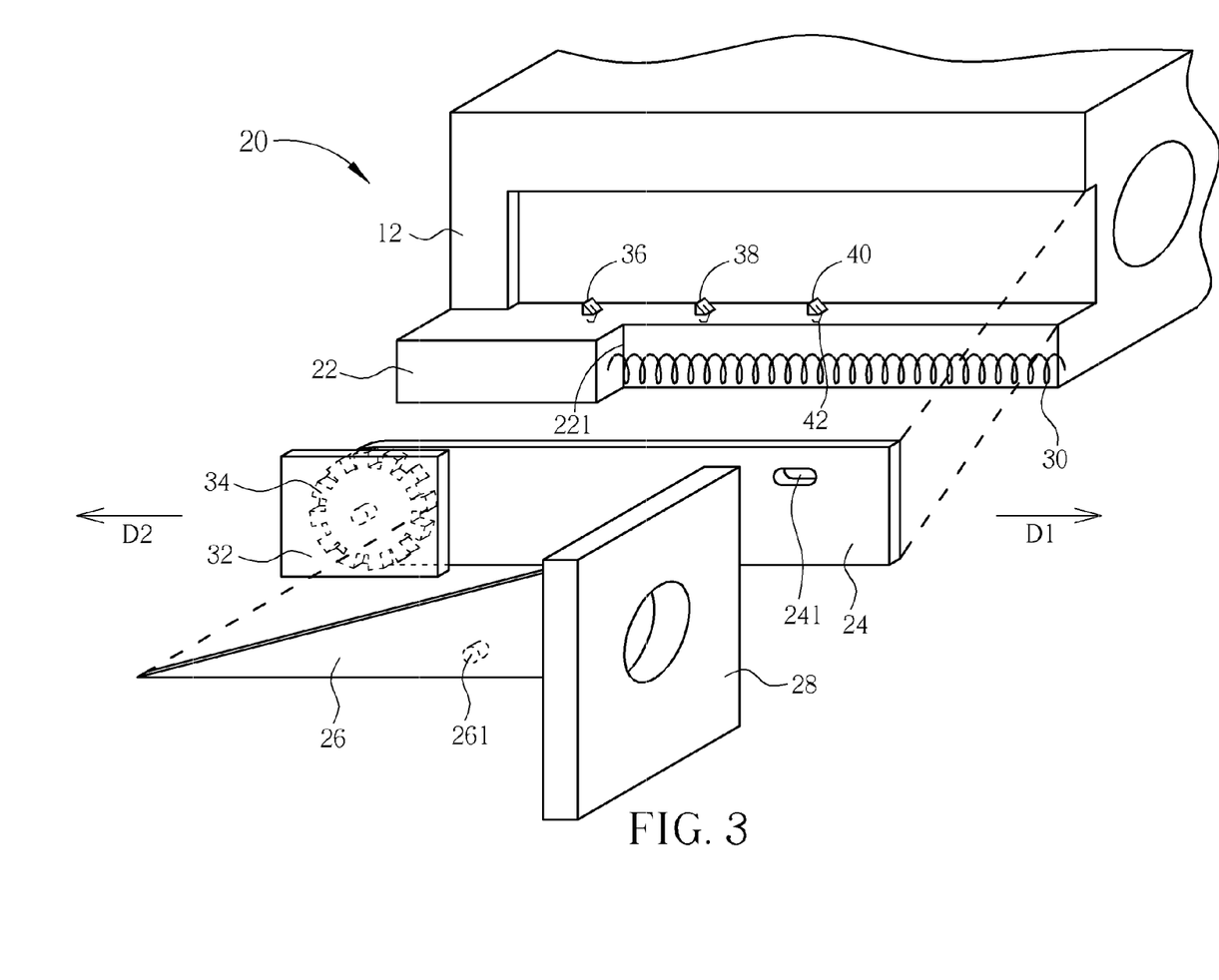
FIG. 3 is an exploded diagram of a push-pop mechanism according to the embodiment of the present invention.
Figure 4:
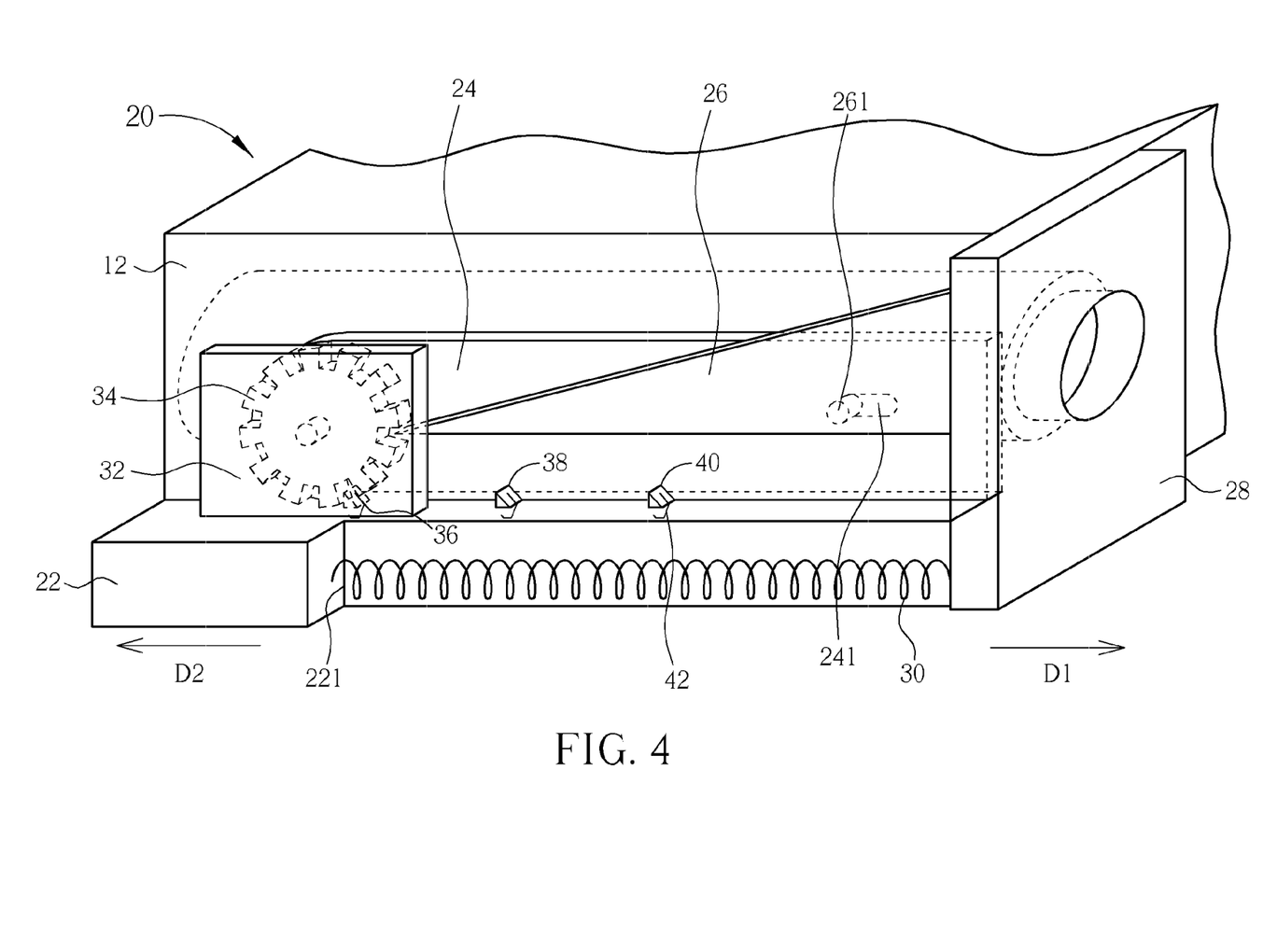
FIG. 4 is an assembly diagram of the push-pop mechanism according to the embodiment of the present invention.

Please refer to FIG. 3 and FIG. 4. FIG. 3 is an exploded diagram of the push-pop mechanism 20 according to the embodiment of the present invention. FIG. 4 is an assembly diagram of the push-pop mechanism 20 according to the embodiment of the present invention. The push-pop mechanism 20 can include a base 22 disposed inside the casing 12, a sliding component 24 disposed on the base 22 in a slidable manner, a contacting component 26 connected to the sliding component 24 in a slidable manner, and a supporting component 28 connected to the contacting component 26. A slot 241 is formed on a surface of the sliding component 24, the contacting component 26 can include a sliding bar 261, and the sliding bar 261 slides inside the slot 241. When the stylus 18 enters the accommodating space 121, the supporting component 28 drives the contacting component 26 and the sliding component 24 to slide relative to the base 22 in a first direction D1 by the stylus 18. In addition, the push-pop mechanism 20 can further include a resilient component 30 connected to the supporting component 28 and the base 22. When pressure forced by the stylus 18 on the supporting component 28 is released, the resilient component 30 drives the supporting component 28 to move in a second direction D2 different from the first direction D1.

As shown in FIG. 3 and FIG. 4, the push-pop mechanism 20 can further include a baffle 32, a gear 34 disposed between the sliding component 24 and the baffle 32, a plurality of tenons 36, 38, 40 respectively disposed on the base 22, and a plurality of resilient clips 42 respectively connected to the corresponding tenons. The resilient clip 42 is for protruding the tenons 36, 38, 40 from the base 22. When the contacting component 26 contacts against the gear 34 in the second direction D2, rotation of the gear 34 is constrained, and the contacting component 26 can be for pushing the gear 34 to slide in the second direction D2, so as to slide the baffle 32 and the sliding component 24 relative to the base 22. On the other hand, when the gear 34 slides in the first direction D1 by the sliding component 24 and the contacting component 26 does not contact against the gear 34 in the second direction D2, the tenons 36, 38, 40 can be for rotating the gear 34, so that the gear 34 can rotate the baffle 32 to engage with a concave 221 on the base 22 for constraining the sliding component 24 relative to the base 22. The tenons 36, 38, 40 can respectively be a one-way tenon, which means that the one-way tenon does not rotate the gear and the gear 34 overstrides the one-way tenon when the gear 34 slides in the second direction D2.

Figure 5:
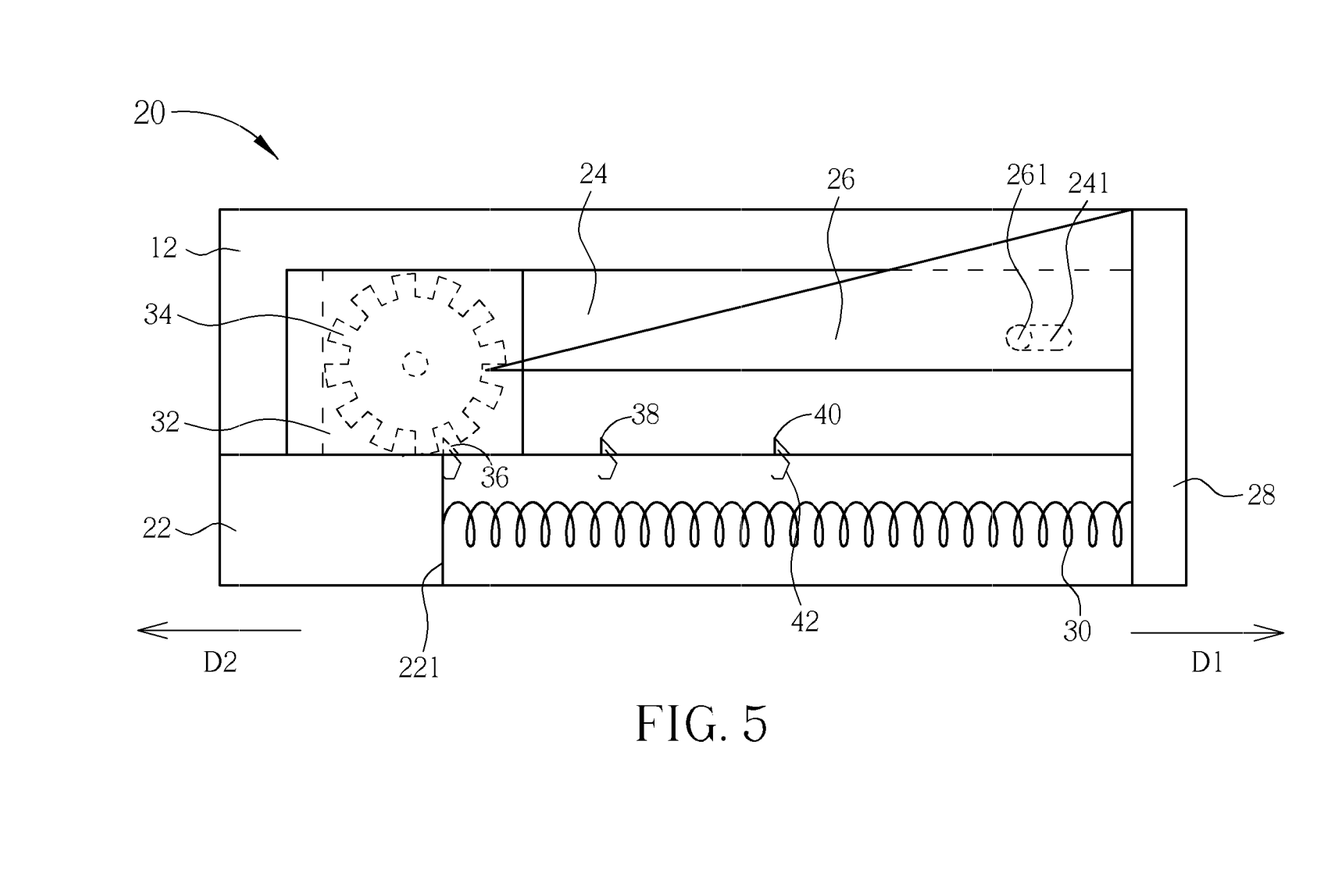
FIG. 5 to FIG. 10 are diagrams of the push-pop mechanism in different operating modes according to the embodiment of the present invention.
Figure 6:
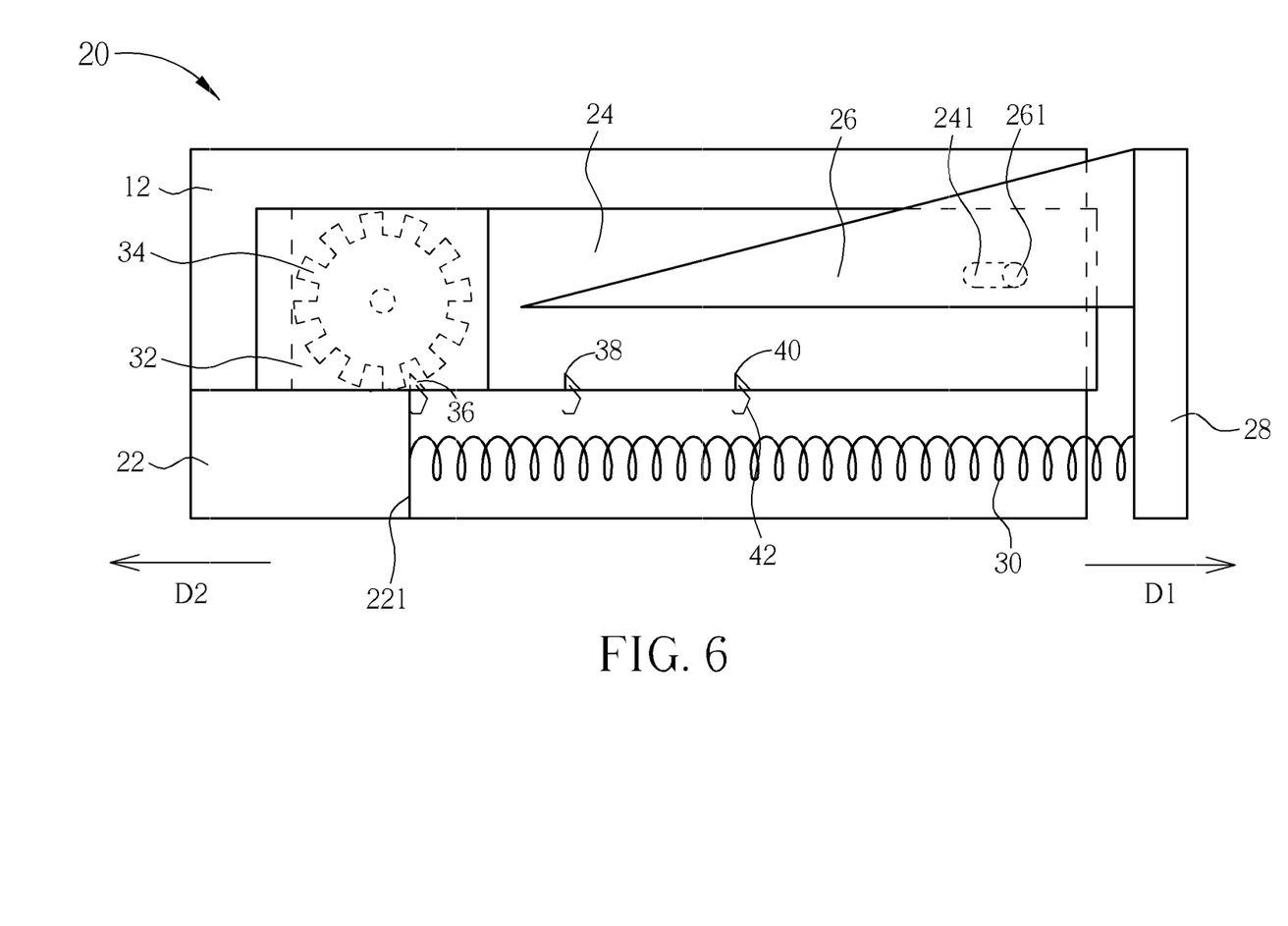
Figure 7:
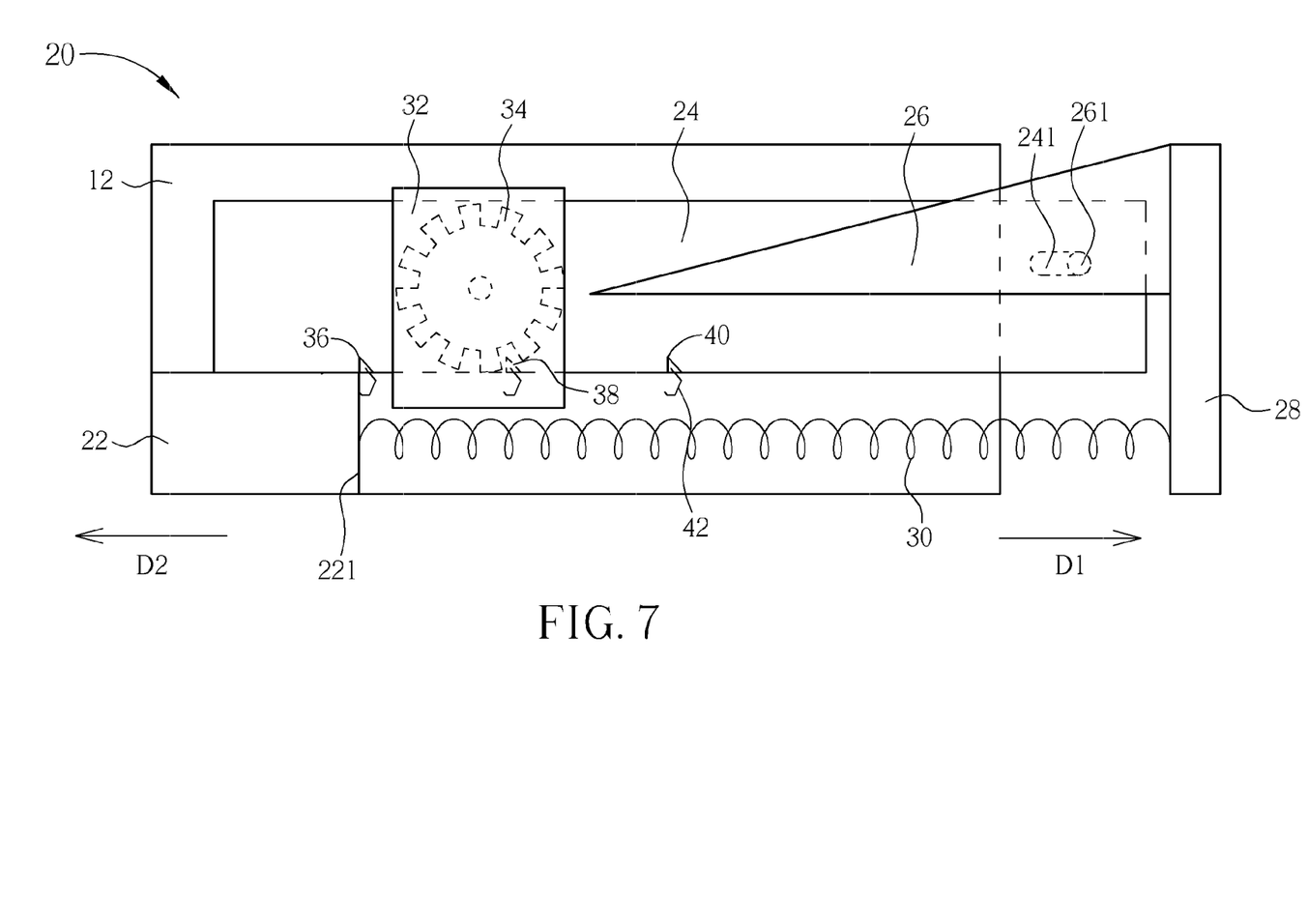
Figure 8:
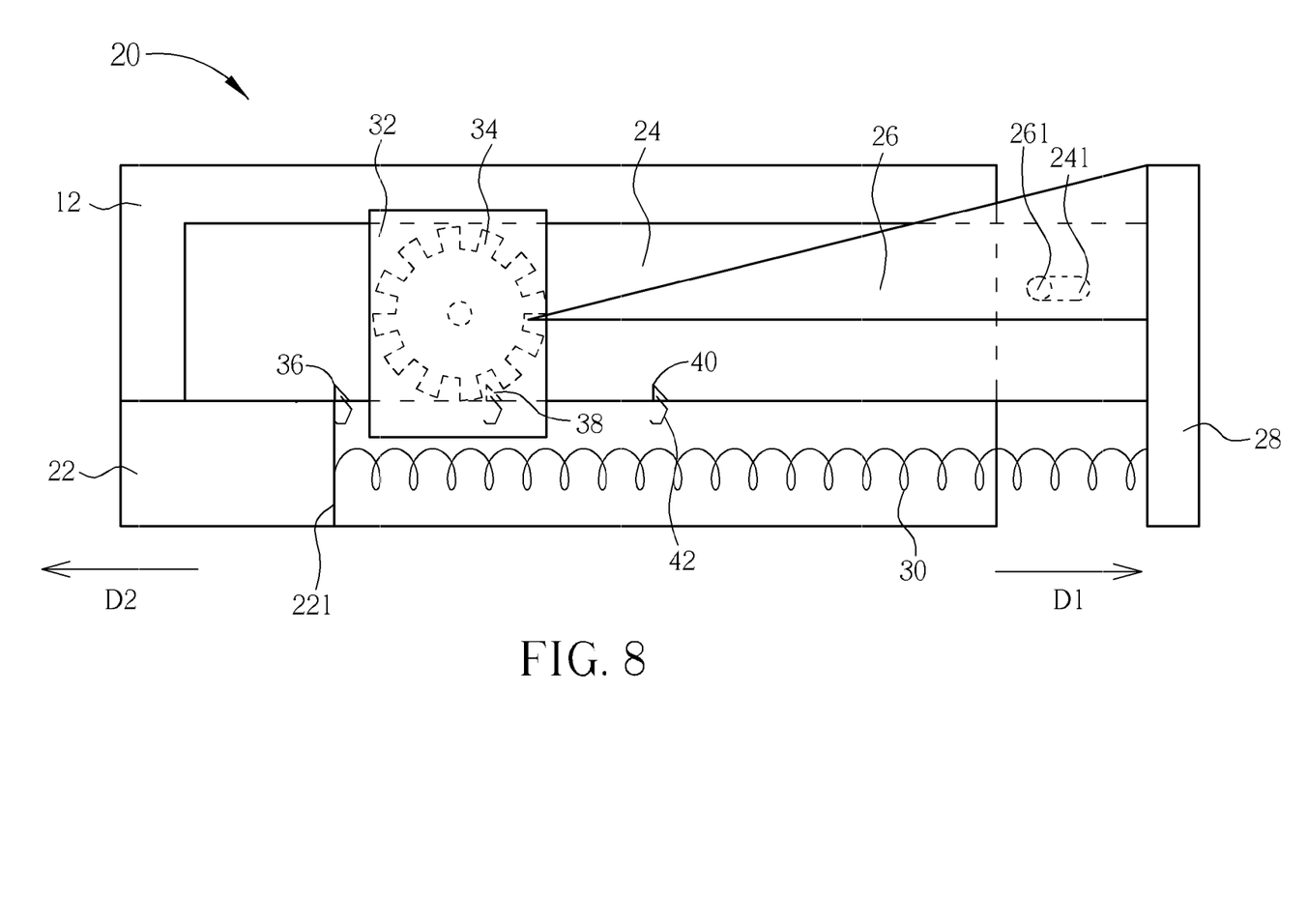

Please refer to FIG. 5 to FIG. 10. FIG. 5 to FIG. 10 are diagrams of the push-pop mechanism 20 in different operating modes according to the embodiment of the present invention. As shown in FIG. 5, the stylus 18 of the portable electronic device 10 is not accommodated inside the accommodating space 121. At this time, the gear 34 is located at a side of the tenon 36 far from the tenon 38, and the contacting component 26 contacts against the gear 34 for constraining the rotation of the gear 34. As shown in FIG. 6, as the stylus 18 is inserted into the accommodating space 121 and pushes the supporting component 28 to slide in the first direction D1, the supporting component 28 can drive the sliding bar 261 of the contacting component 26 to slide inside the slot 241 on the sliding component 24, so that the gear 34 can be rotated as separating from the contacting component 26. After, the contacting component 26 slides the sliding component 24 relative to the base 22 in the first direction D1. As shown in FIG. 6 and FIG. 7, when the stylus 18 enters the accommodating space 121 further, the sliding component 24 slides relative to the base 22 in the first direction D1, and the sliding component 24 can slide the baffle 32 and the gear 34 relative to the base 22 simultaneously, so that the gear 34 rotates the baffle 32 through 90 degrees by the tenon 36, and the baffle 32 can be engaged inside the concave 221 on the base 22. As shown in FIG. 8, the stylus 18 is not pressed, and the resilient component 30 can slide the supporting component 28 in the second direction D2, so as to drive the contacting component 26 to contact against the gear 34 again. Generally, the end of the stylus 18 can align with the opening of the accommodating space 121 in this situation.

Figure 9:
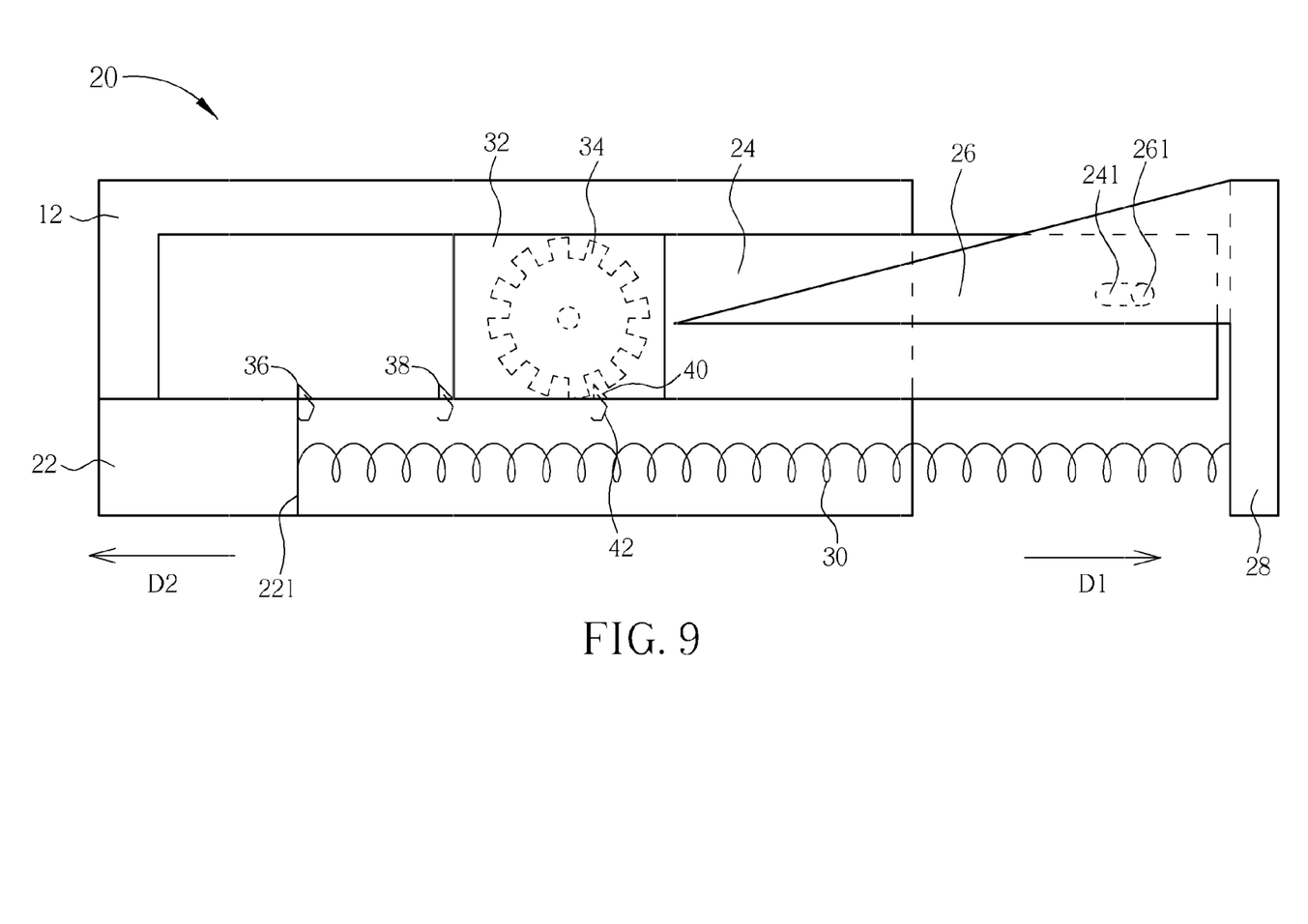

When the stylus 18 is intended to be ejected from the accommodating space 121, the stylus 18 can be pressed lightly to enter the accommodating space 121 deeply, so as to drive the sliding component 24, the contacting component 26, the supporting component 28, the baffle 32 and the gear 34 to slide relative to the base 22 in the first direction D1. As shown in FIG. 9, the contacting component 26 moves away from the gear 34, and the tenon 38 drives the gear 34 to rotate the baffle 32 through 90 degrees, so that the baffle 32 can move away from the concave 221 on the base 22. After the pressure on the stylus 18 is released, the resilient component 30 can move the supporting component 28 in the second direction D2, and the baffle 32 and the gear 34 can slide from positions shown in FIG. 9 to positions shown in FIG. 5, so as to eject the stylus 18 from the accommodating space 121. Therefore, the push-pop mechanism 20 can fix the stylus 18 inside the accommodating space 121 and eject the stylus 18 from the accommodating space 121 according to the above-mentioned processes.

Figure 10:
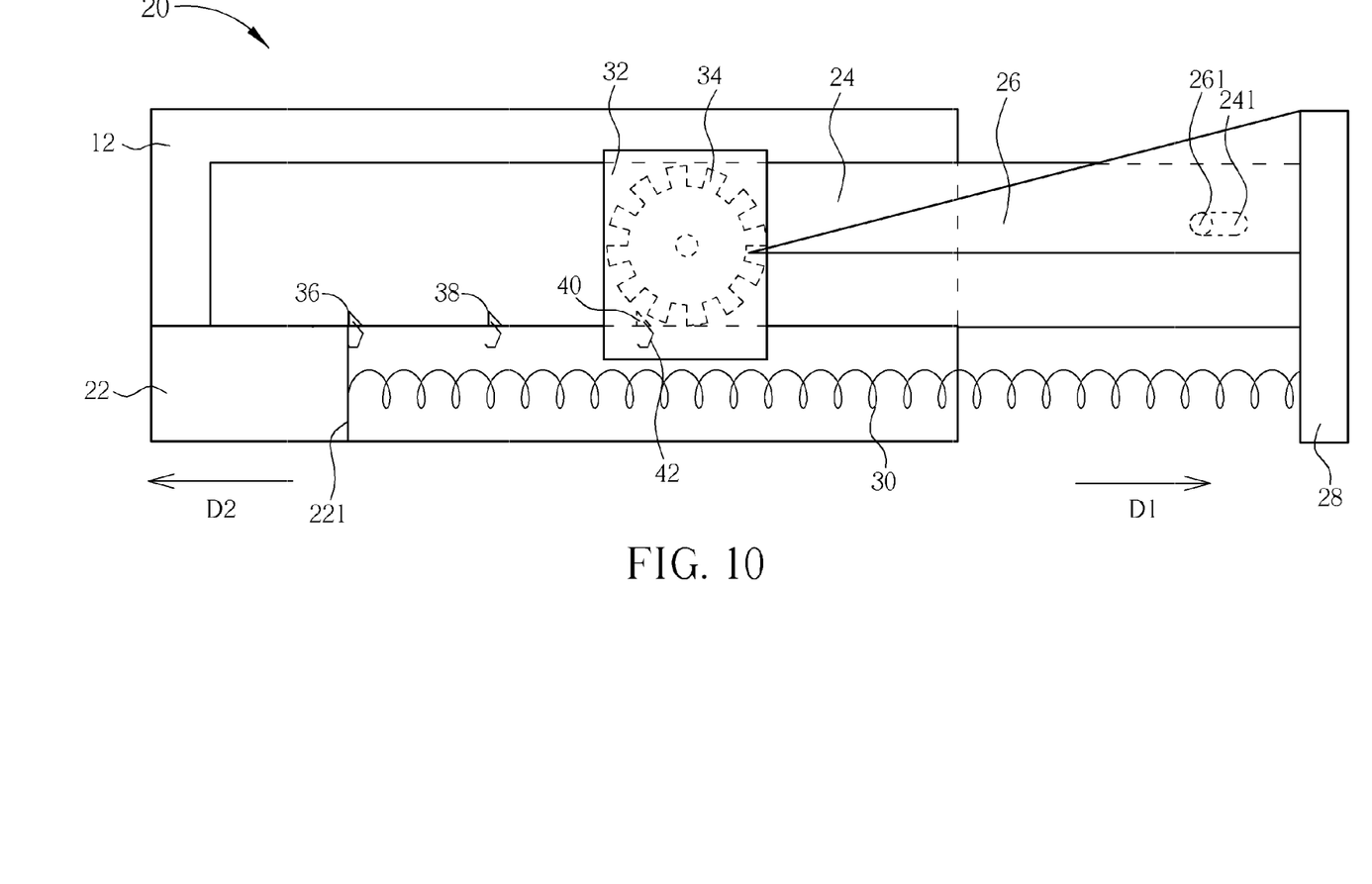

In addition, when the stylus 18 has been accommodated inside the accommodating space 121, the connector 16 and the stylus 18 can accommodate inside the accommodating space 121 simultaneously, the connector 16 can be inserted into the accommodating space 121 first, and mechanical motion of the push-pop mechanism 20 is sequentially driven as shown in FIG. 8, FIG. 9, and FIG. 10. The connector 16 can push the stylus 18 in the first direction D1, so that the stylus 18 drives components of the push-pop mechanism 20 to function corresponding mechanical motion simultaneously. As shown in FIG. 8 to FIG. 10, when the connector 16 is inserted into the accommodating space 121 and slides the gear 34 in the first direction D1, the tenon 38 dives the gear 34 to rotate the baffle 32 through 90 degrees, and the gear 34 is moved from a position between the tenon 36 and the tenon 38 to a position between the tenon 38 and the tenon 40. Then, the gear 34 slides relative to the base 22 in the first direction D1 continuously, and the tenon 40 drives the gear 34 to rotate the baffle 32 through 90 degrees, so that the gear 34 is moved from the position between the tenon 38 and the tenon 40 to a side of the tenon 40 far from the tenon 38. Meanwhile, the stylus 18 is located at a position deeper than the position shown in FIG. 8, and the connector 16 is electrically connected to the signal terminal 14 disposed inside the accommodating space 121. Furthermore, when the connecter 16 is taken from the accommodating space 121, the resilient component 30 drives the supporting component 28 to move the contacting component 26 for sliding the gear 34 from the position shown in FIG. 10 to the position shown in FIG. 8, and the baffle 32 slides on the base 22 with the gear 34 due to the one-way tenons 36, 38, 40. Therefore, the connector 16 can be taken from the accommodating space 121, and the stylus 18 is accommodated inside the accommodating space 121.

Comparing to the prior art, the portable electronic device of the present invention can accommodate the stylus and the connector (the audio signal connector) inside the accommodating space simultaneously. The push-pop mechanism of the portable electronic device can fix the stylus at the corresponding position according to the depth of the accommodating space whereinto the stylus enters, so as to economize mechanical space of the portable electronic device for advantages of light weight and preferable aesthetic.

Those skilled in the art will readily observe that numerous modifications and alterations of the device and method may be made while retaining the teachings of the invention.

What is claimed is:

1. A portable electronic device comprising:
   a casing whereinside an accommodating space is formed;
   a signal terminal disposed on a lateral wall of the accommodating space;
   a stylus accommodated inside the accommodating space of the casing in a movable manner;
   a push-pop mechanism disposed inside the accommodating space of the casing for fixing the stylus at a corresponding position according to depth of the accommodating space whereinto the stylus enters, the push-pop mechanism comprising:
      a base disposed inside the casing;
      a sliding component disposed on the base in a slidable manner, a slot being formed on a surface of the sliding component;
      a contacting component connected to the sliding component in a slidable manner, the contacting component comprising a sliding bar for sliding inside the slot, to slide the contacting component relative to the sliding component; and
      a supporting component connected to the contacting component, the stylus pushing the supporting component for driving the contacting component and the sliding component to slide relative to the base in a first direction; and
   a connector for inserting into the accommodating space of the casing so as to electrically connect with the signal terminal to transmit a corresponding signal.

2. The portable electronic device of claim 1, wherein the push-pop mechanism is further for ejecting the stylus from the accommodating space.

3. The portable electronic device of claim 1, wherein the push-pop mechanism further comprises:
   a resilient component connected to the supporting component and the base for moving the supporting component in a second direction opposite to the first direction.

4. The portable electronic device of claim 1, wherein the connector is an audio signal connector.

5. A portable electronic device comprising:
   a casing whereinside an accommodating space is formed;
   a signal terminal disposed on a lateral wall of the accommodating space;
   a stylus accommodated inside the accommodating space of the casing in a movable manner;
   a push-pop mechanism disposed inside the accommodating space of the casing for fixing the stylus at a corresponding position according to depth of the accommodating space whereinto the stylus enters, the push-pop mechanism comprising:
      a base disposed inside the casing;
      a sliding component disposed on the base in a slidable manner;
      a contacting component connected to the sliding component in a slidable manner;
      a supporting component connected to the contacting component, the stylus pushing the supporting component for driving the contacting component and the sliding component to slide relative to the base in a first direction;
      a baffle; and
      a gear disposed between the sliding component and the baffle for rotating the baffle to engage inside a concave on the base so as to constrain the sliding component relative to the base; and
   a connector for inserting into the accommodating space of the casing so as to electrically connect with the signal terminal to transmit a corresponding signal.

6. The portable electronic device of claim 5, wherein the push-pop mechanism is further for ejecting the stylus from the accommodating space.

7. The portable electronic device of claim 5, wherein a slot is formed on a surface of the sliding component, and the contacting component comprises a sliding bar for sliding inside the slot, so that the contacting component slides relative to the sliding component.

8. The portable electronic device of claim 5, wherein the push-pop mechanism further comprises:
   a resilient component connected to the supporting component and the base for moving the supporting component in a second direction opposite to the first direction.

9. The portable electronic device of claim 5, wherein the contacting component is for contacting against the gear in a second direction opposite to the first direction, so as to constrain rotation of the gear.

10. The portable electronic device of claim 9, wherein the contacting component is further for pushing the gear in the second direction opposite to the first direction, so as to slide the baffle and the sliding component relative to the base.

11. The portable electronic device of claim 5, wherein the push-pop mechanism further comprises:
   at least one tenon disposed on the base, the tenon being for rotating the gear when the gear slides in the first direction so that the gear rotates the baffle.

12. The portable electronic device of claim 11, wherein the tenon is a one-way tenon, and the one-way tenon does not rotate the gear when the gear slides in the second direction opposite to the first direction.

13. The portable electronic device of claim 12, wherein the push-pop mechanism further comprises:
   a resilient clip connected to the one-way tenon.

14. The portable electronic device of claim 5, wherein the connector is an audio signal connector.

* * * * *